April 23, 1957 L. H. WALKER 2,789,369
DESICCANT PACKET
Filed May 27, 1955

L. H. WALKER
*INVENTOR.*

BY *R. Hoffman*
*W. Bier*
ATTORNEYS

United States Patent Office 2,789,369
Patented Apr. 23, 1957

2,789,369

DESICCANT PACKET

Leander H. Walker, Berkeley, Calif., assignor to United States of America as represented by the Secretary of Agriculture Application May 27, 1955, Serial No. 511,817

1 Claim. (Cl. 34—80)

(Granted under Title 35, U. S. Code (1952), sec. 266)

A non-exclusive, irrevocable, royalty-free license in the invention herein described for all governmental purposes, throughout the world, with the power to grant sub-licenses for such purposes, is hereby granted to the Government of the United States.

This invention relates to a novel desiccant packet, methods of fabricating it and methods of applying the packet in use. A principal object of the invention is to provide a desiccant packet of simple and low-cost construction which is adapted for insertion into a container and which has means cooperative with the walls of the container for maintaining the packet in the central portion of the container thereby to promote uniform absorption of moisture from dehydrated food particles stored therein thus avoiding caking of the food particles. Further objects and advantages of the invention will be obvious from the accompanying description taken in connection with the annexed drawing.

Figure 1:
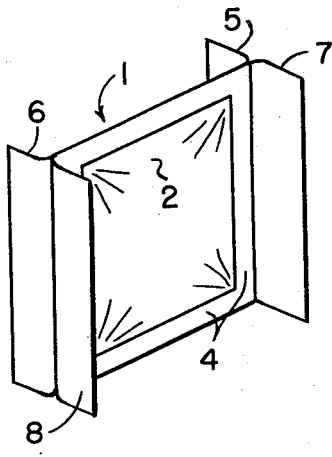
Figure 2:
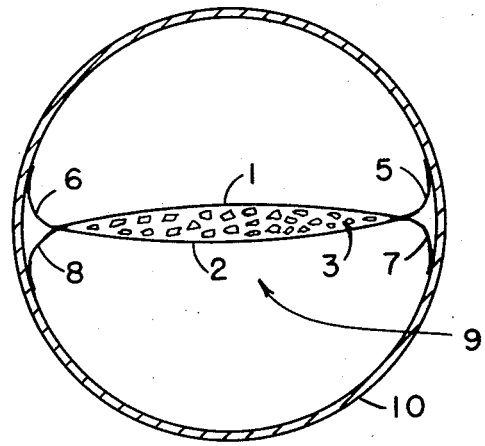

In the drawing, Fig. 1 is a three-dimensional representation of the packet in accordance with this invention and Fig. 2 is a cross-sectional view of the packet in place in a container.

It is well known in the art that it is often advantageous to package certain materials together with a desiccant so that during storage the material will not undergo deleterious changes. For example, dehydrated food particles such as dehydrated fruit juices are often packaged in an hermetically sealed container together with a paper packet containing a desiccant agent such as calcium oxide. When the resulting package is stored, moisture present in the food particles is absorbed by the desiccant and as a result the storage stability of the food particles is improved and caking thereof cannot take place.

In packaging of dehydrated food particles it is customary to place a desiccant packet loosely within the container together with the food particles. This technique does not give optimum results because absorption of moisture from the food particles is not uniform. Thus if the desiccant packet is at the bottom of the container, the food particles at the bottom and near the desiccant packet will be low in moisture content whereas those particles at the top of the container will be relatively high in moisture content so that their storage stability will be low and they may even cake. It has thus been observed that when such packages are stored at relatively high temperatures, the food particles in the areas remote from the desiccant packet will cake together forming a hard, insoluble mass whereas the food particles in proximity to the desiccant packet remain in a free-flowing state. In attempts to alleviate this situation it has been proposed that the desiccant packet be positioned in the central portion of the container and the food particles be placed all around it. This system is not successful for the reason that as the container is handled as in shipping, the desiccant packet moves about in the container and so the same problems of non-uniformity of moisture content occurs.

The desiccant packet of this invention is a complete solution to the problem discussed above. This packet is so constructed that when placed in the central portion of a container it will remain there, no matter how the container is shifted about. Further, with the packet of this invention, no holding device need be used to maintain the packet in its position in the central portion of the container during the time when the container is being filled with the food particles; the packet maintains itself in such position. Since the packet maintains its position in the central portion of the container during filling of the container and subsequent movement of the container in storage, etc. the food particles assume an essentially uniform moisture content because each food particle is at most a short distance away from the desiccant packet.

Referring now to the drawing, the construction of the packet of the invention is explained as follows:

The packet is formed of two pieces of gas-permeable resilient sheet material designated as 1 and 2. The desiccant 3 is placed between sheets 1 and 2 adjacent the middle of the sheets and the sheets are then sealed to one another to completely enclose the desiccant in the thus-formed desiccant-containing portion, the zone of sealing being spaced from the ends of the sheets to leave the end portions of the sheets in an unjoined state. The margins 4 represent the areas where the sheets are sealed about the desiccant. The end portions of each of the sheets 1 and 2 are then folded or bent at about right angles to the middle portion of the sheets to produce resilient wings 5, 6, 7, and 8 at opposite sides of the packet, these wings forming the means for resiliently pressing against opposite walls of the container in which the packet is slidably received thus to slidably maintain the packet in the central portion thereof.

It is evident that by forming these wings 5, 6, 7, and 8, the packet can stand upright, the bottoms of the wings acting as supports to hold the packet upright.

Reference is now made to Fig. 2 which illustrates the packet in use. The packet, generally designated as 9 is inserted into container 10 so that it extends in the central portion thereof. In this position, the wings 5, 6, 7, and 8 press against opposite walls of the container to maintain the packet in the central portion thereof despite forces exerted during filling, sealing, shipping, etc.

After placement of packet 9 in container 10, the dehydrated food particles are filled into the container so that the particles completely surround packet 9 and the container is then sealed.

Sheets 1 and 2 are made of pliant, gas-permeable sheet material such as paper, cellophane, cellulose acetate, or laminates of paper and plastic films. Sealing of the sheets 1 and 2 about margins 4 may be accomplished by use of adhesives or by heat-sealing techniques where plastic sheets are used. The desiccant 3 may be composed of silica, alumina, montmorillonite, calcium oxide, and so forth. Preferably, the desiccant is tightly packed between sheets 1 and 2 so that the desiccant is held in place and will not move to the base of the packet when it is positioned in a container.

It is obvious that the size of the desiccant packet must be correlated with the size of container in which it is to be used. Generally the length of the packet is just a little less than the depth of the container. The width of the packet is so proportioned that when it is in the container, the wings 5, 6, 7, and 8 will be forced somewhat inwardly by the walls of the container whereby the packet will be held securely in place. To get the most supporting effect from this pressure of the walls against the wings, the sheets 1 and 2 may be formed of sheet material which has resilient properties, for example, plastic film material laminated with strips of stiff paper, so that the wings will act as springs pressing against the inner periphery of the container.

Having thus described the invention, what is claimed is:

A package for storing dehydrated food particles comprising a container and a desiccant packet slidably received in the container, said packet comprising two sheets of gas-permeable, resilient material, a quantity of desiccant material between the sheets adjacent the middle of the sheets, the sheets being sealed to one another to completely enclose the desiccant material therebetween, the zone of sealing being spaced from the ends of the sheets to leave the end portions of the sheets in an unjoined state, the end portions of each sheet being bent at about right angles to the middle portion of the sheet to form resilient wings at opposite sides of the packet, said wings resiliently pressing against opposite walls of the container to slidably maintain the packet in the central portion thereof.

References Cited in the file of this patent

UNITED STATES PATENTS

| | | |
|---|---|---|
| 1,217,820 | Peterson | Feb. 27, 1917 |
| 1,222,656 | Moyer | Apr. 17, 1917 |
| 1,532,831 | Mastin | Apr. 7, 1925 |
| 1,983,691 | Bonardi | Dec. 11, 1934 |
| 2,051,777 | Purington et al. | Aug. 18, 1936 |
| 2,210,862 | Tronstad | Aug. 6, 1940 |
| 2,698,248 | Peters | Dec. 28, 1954 |